US012577439B2

(12) United States Patent
Prenzel et al.

(10) Patent No.: US 12,577,439 B2
(45) Date of Patent: Mar. 17, 2026

(54) MULTILAYER ADHESIVE TAPE

(71) Applicant: TESA SE, Norderstedt (DE)

(72) Inventors: Alexander Prenzel, Hamburg (DE); Ji Li, Hamburg (DE); Julia Befuss, Hamburg (DE)

(73) Assignee: TESA SE, Norderstedt (DE)

( * ) Notice: Subject to any disclaimer, the term of this patent is extended or adjusted under 35 U.S.C. 154(b) by 506 days.

(21) Appl. No.: 17/312,604

(22) PCT Filed: Dec. 10, 2019

(86) PCT No.: PCT/EP2019/084405
§ 371 (c)(1),
(2) Date: Jun. 10, 2021

(87) PCT Pub. No.: WO2020/120465
PCT Pub. Date: Jun. 18, 2020

(65) Prior Publication Data
US 2022/0041902 A1 Feb. 10, 2022

(30) Foreign Application Priority Data

Dec. 10, 2018 (DE) .................... 10 2018 221 356.9

(51) Int. Cl.
| | |
|---|---|
| *C09J 7/26* | (2018.01) |
| *C08F 220/06* | (2006.01) |
| *C08F 220/18* | (2006.01) |
| *C08K 5/56* | (2006.01) |
| *C09J 7/38* | (2018.01) |

(52) U.S. Cl.
CPC ............. *C09J 7/385* (2018.01); *C08F 220/06* (2013.01); *C08F 220/1804* (2020.02); *C08F 220/1808* (2020.02); *C08F 220/1811* (2020.02); *C08K 5/56* (2013.01); *C09J 7/26* (2018.01); *C09J 2203/354* (2020.08); *C09J 2301/124* (2020.08); *C09J 2301/302* (2020.08); *C09J 2400/163* (2013.01); *C09J 2400/226* (2013.01); *C09J 2400/24* (2013.01); *C09J 2433/00* (2013.01); *Y10T 428/249982* (2015.04); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 7,910,163 | B2 | 3/2011 | Zollner et al. |
| 7,935,382 | B2 | 5/2011 | Park et al. |
| 8,962,777 | B2 | 2/2015 | Ellringmann et al. |
| 9,260,637 | B2 | 2/2016 | Ellringmann et al. |
| 9,896,605 | B2 | 2/2018 | Zollner et al. |
| 10,457,791 | B2 | 10/2019 | Czerwonatis et al. |
| 11,384,263 | B2 * | 7/2022 | Ardente .................. C09J 11/06 |
| 11,566,152 | B2 * | 1/2023 | Lohmann-Rademacher ............... C08K 5/01 |
| 2008/0118751 | A1 | 5/2008 | Zollner et al. |
| 2009/0048398 | A1 | 2/2009 | Zollner et al. |
| 2009/0053447 | A1 | 2/2009 | Zollner et al. |
| 2011/0165402 | A1 | 7/2011 | Zollner et al. |
| 2011/0166311 | A1 | 7/2011 | Ellringmann et al. |
| 2011/0244230 | A1 | 10/2011 | Tsubaki et al. |
| 2012/0029105 | A1 | 2/2012 | Czerwonatis et al. |
| 2013/0017389 | A1 * | 1/2013 | Tamura ..................... C09J 7/38 428/314.4 |
| 2013/0177758 | A1 * | 7/2013 | Shigetomi ............. C09J 133/10 428/354 |
| 2014/0057091 | A1 * | 2/2014 | Krawinkel ................ C09J 7/38 427/208.4 |
| 2015/0024132 | A1 | 1/2015 | Zollner et al. |
| 2015/0114558 | A1 | 4/2015 | Ellringmann et al. |
| 2017/0226308 | A1 | 8/2017 | Czerwonatis et al. |
| 2019/0016927 | A1 | 1/2019 | Lohmann et al. |
| 2020/0325362 | A1 | 10/2020 | Burmeister et al. |
| 2022/0041902 | A1 * | 2/2022 | Prenzel ............. C08F 220/1808 |

FOREIGN PATENT DOCUMENTS

| | | | |
|---|---|---|---|
| DE | 10 2009 015 233 A1 | 10/2010 |
| DE | 10 2016 202 479 A1 | 8/2017 |
| DE | 10 2018 200 957 A1 | 4/2019 |
| EP | 1 802 722 B1 | 2/2009 |
| EP | 2 226 372 A1 | 9/2010 |
| EP | 2 305 389 A1 | 4/2011 |
| EP | 2 617 789 A1 | 7/2013 |
| EP | 2 414 143 B1 | 7/2014 |
| WO | 2013/048945 A1 | 4/2013 |
| WO | 2013/048985 A2 | 4/2013 |
| WO | 2017/140801 A1 | 8/2017 |
| WO | 2017/207119 A1 | 12/2017 |
| WO | 2019/229150 A1 | 12/2019 |

OTHER PUBLICATIONS

Product specification "aluminum acetylacetonate" from Sigma-Aldrich, Dec. 16, 2010 (Year: 2010).*

* cited by examiner

*Primary Examiner* — Anish P Desai
(74) *Attorney, Agent, or Firm* — Norris McLaughlin, PA

(57) ABSTRACT

Disclosed are powerful adhesive tapes, which rapidly coat rough and/or curved surfaces with different surface energies and thereby build up high adhesion. The adhesive joints formed in this way furthermore have good shear strength, even at elevated temperatures. Finally, enduring mechanical loading on the adhesive joints does not lead to the adhesive tape peeling from the surface. This is achieved with an adhesive tape comprising at least one foamed layer and at least one adhesive compound layer, wherein the adhesive compound layer contains at least one poly(meth)acrylate, and the poly(meth)acrylate is cross-linked with at least one covalent and at least one coordinative cross-linker.

7 Claims, 2 Drawing Sheets

MULTILAYER ADHESIVE TAPE

This application is a 371 of International Patent Application No. PCT/EP2019/084405, filed Dec. 10, 2019, which claims foreign priority benefit under 35 U.S.C. § 119 of the German Patent Application No. 10 2018 221 356.9, filed Dec. 10, 2018, the disclosures of which patent applications are incorporated herein by reference.

The invention pertains to the technical field of adhesive tapes as are widely used for the joining of structural parts and device components. The invention pertains more specifically to foamed adhesive tapes featuring a specially crosslinked pressure-sensitive adhesive.

One of the topics of the invention is the relevant adhesion-technology parameter of "wetting". Wetting is understood below to refer to the development of an interface between a pressure-sensitive adhesive and the substrate to be bonded. The term "wetting" therefore describes the capacity of a pressure-sensitive adhesive to compensate unevennesses and/or curvatures of the surface and to displace air between itself and the substrate. The greater the wetting, the more effectively the interactions between pressure-sensitive adhesive and substrate are able to develop and the better the sticking and the adhesion. A frequent observation, especially on rough surfaces or surfaces with production-related unevennesses or curvatures or corrugations, is that wetting once achieved becomes weaker again as a result of mechanical loads, in other words, that dewetting occurs. The ability to hold a flexible article, typically in the form of a film, plastic or metal plate/or foam film/plate, elastically deformed to conform to the surface contours of a bonding area (which may be curved, rough, and so on), against the exerted repulsion force, with return to its original shape (i.e., an ability to withstand the repulsion force of the article) is frequently also referred to as "repulsion resistance".

Furthermore, wetting should be distinguished from the development of peel adhesion over time. Even when initial wetting is good, the peel adhesion may increase further with time, because increasing numbers of functional groups capable of interacting with the surface become oriented toward the surface.

For diverse fields of application, such as in the construction sector, in the industrial manufacture of technical products, or for assembly purposes, for example, there is a requirement for adhesive tapes which are increasingly thick but also strongly bonding (referred to as "adhesive assembly tapes"). Since the bonds frequently take place outdoors and/or the bonded products are subject to external weathering effects, the expectations of the properties of such adhesive tapes are frequently high. Hence the bond is to be strong, durable, and weather-resistant; in many cases, high moisture resistance, heat resistance, and resistance to combined heat and humidity are required. The adhesive tapes, moreover, are to rapidly wet and, in so doing, compensate unevennesses in the bondline and/or on the substates to be bonded, and to exhibit high peel adhesion forces from the start (initial peel adhesion forces). When using unfoamed adhesive tapes, a further advantage of effective wetting is that it enables transparent materials to be bonded without optical defects, as is increasingly being desired even for thick adhesive tapes (in the bonding, for instance, of transparent materials such as glass or transparent plastics).

The adhesive tapes employed for such purposes are commonly furnished with adhesives for which the technical adhesive properties must be matched very well to one another. For instance, cohesion, initial tack, flow behavior, and other properties must be very finely tuned. Given that the technical forms of the pressure-sensitive adhesive which influence these properties frequently have divergent effects on the individual properties, fine tuning is generally difficult, or a compromise must be accepted in the outcome.

For very thick adhesive tapes in particular it is frequently difficult, moreover, to realize highly homogeneous products; as a result of processing, very thick adhesive tapes are frequently not homogenous right through the layer. This is usually undesirable, given the frequent requirement for adhesive tapes which have well-defined properties irrespective of their layer thickness and of their production.

Substances having viscoelastic properties suitable for pressure-sensitive adhesive applications are notable in reacting to mechanical deformation both with viscous flow and with elastic resilience forces. In terms of their respective proportions, the two processes are in a certain relationship to one another, dependent not only on the precise composition, the structure and the degree of crosslinking of the substance in question, but also on the rate and duration of the deformation, and on the temperature.

The proportional viscous flow is necessary for achievement of adhesion. Only the viscous components, brought about by macromolecules having relatively high mobility, permit effective wetting and effective flow onto the substrate to be bonded. A high viscous flow component results in high intrinsic adhesiveness (also referred to as pressure-sensitive adhesiveness or tack) and hence often also to a high peel adhesion. Highly crosslinked systems, crystalline polymers or polymers which have undergone glasslike solidification generally lack intrinsic adhesiveness, for lack of flowable components.

The proportional elastic resilience forces are necessary for the achievement of cohesion. They are produced, for example, by very long-chain and highly entangled macromolecules, and also by physically or chemically crosslinked macromolecules, and they allow the transmission of the forces which act on an adhesive bond. They are responsible for endowing an adhesive bond with the capacity to withstand a sustained load acting on it, in the form of a long-term shearing load, for example, to a sufficient extent and over a relatively long period of time.

In foamed multilayer adhesive tapes, a sustained load may result in uneven distribution of stress, which, if the forces are greater than the adhesion of the layer of pressure-sensitive adhesive to the surface, are manifested in partial detachment of the layer of pressure-sensitive adhesive. The proportion of the area that is wetted therefore becomes smaller.

In order to prevent the pressure-sensitive adhesives flowing off (running down) from the substrate, and to guarantee sufficient stability of the pressure-sensitive adhesive in the bonded assembly, sufficient cohesion of the pressure-sensitive adhesives is therefore necessary. For good adhesion properties, however, the pressure-sensitive adhesives must additionally be capable of flowing onto the substrate, developing interactions with the surface in the boundary layer sufficiently, and guaranteeing effective and durable wetting of the substrate surface. In order to prevent fractures within the bondline (within the layer of pressure-sensitive adhesive), moreover, a certain elasticity is needed on the part of the pressure-sensitive adhesive.

To achieve sufficient cohesion on the part of the pressure-sensitive adhesives, they are generally crosslinked—that is, individual macromolecules are linked to one another by bridging bonds. Crosslinking may be accomplished in a variety of ways: there are physical and chemical (thermal) crosslinking methods, for example.

Chemical crosslinking methods usually lead to an irreversible, frequently covalent network, which ensures sufficient cohesion particularly at high temperatures. Because of the irreversibility of the network, however, stresses such as those caused by mechanical deformation cannot be stepped down or dissipated, and the adhesion drops as a result of the reduced mobility of the polymer chains. This can lead to the detachment (dewetting) of the adhesive under sustained load.

In order to produce homogenous adhesive tapes it is advantageous to subject the polymers to thermal crosslinking: it is readily possible even for thick layers to be supplied uniformly with thermal energy. Layers of composition which have been crosslinked by actinic radiation (ultraviolet radiation or electron beams, for example), in contrast, exhibit a profile of crosslinking through the crosslinked layer. This crosslinking profile results from the fact that the radiation is limited in its depth of penetration into the layer, with the intensity of the radiation also decreasing in line with the depth of penetration, owing to absorption processes. Consequently, the outer regions of a radiation-crosslinked layer of composition are crosslinked to a greater extent than the regions located more internally, with the intensity of crosslinking decreasing overall toward the interior. For thick layers in particular, this effect is very significant.

EP 2 305 389 A2 and EP 2 617 789 A1, for instance, describe thermally crosslinked, foamed and unfoamed adhesive assembly tapes having good adhesive and cohesive properties. These adhesive tapes, however, exhibit weaknesses in their wetting behavior and also in relation to bonding on curved substrates, particularly if the latter have a low surface energy.

WO 2013/048985 A2 and WO 2013/048945 A1 describe multilayer adhesive assembly tapes which are suitable in particular for bonding on apolar surfaces such as automobile finishes. The adhesive tapes of WO 2013/048985 A2 are characterized in that the outer PSA (pressure-sensitive adhesive) layer comprises (meth)acrylic esters with 2-alkylalkanol residues which have 12 to 32 carbon atoms, and optionally with C1-12 alkanol residues. In WO 2013/048945 A1, the outer PSA layer comprises, in particular, acrylic esters with a primary alcohol residue which has 14 to 25 carbon atoms and an iso index of at least 2 to at most 4. Besides the disadvantage that the products described therein are crosslinked using UV radiation, it is found that under load, the initially good wetting deteriorates, and hence dewetting occurs.

US 2011/0244230 A1 describes an acrylate-based foam adhesive tape which is particularly conforming and is highly suitable for bonding on uneven substrates. However, the adhesive tapes described are crosslinked by UV radiation, and so the resulting crosslinking gradient results in relatively poor wetting behavior.

EP 2 226 372 A1 describes a thermally crosslinked PSA which comprises a polyacrylate having an acrylic acid concentration of 8 to 15 wt % and is characterized in that the ratio of the linear to the branched acrylic esters is in the range from 1:6 to 10:1 mass fractions. In all examples in accordance with the invention, use is made of thermal, coordinative crosslinkers such as aluminum(III) acetylacetonate, for example, which lead to a reversible network. The compositions, however, display inadequate temperature stability for use as an adhesive assembly tape.

It is an object of the invention to specify powerful adhesive tapes which rapidly wet rough and/or curved surfaces having different surface energies, examples being metals, surfaces of plastics such as ABS or polycarbonate, and automobile finishes, and in doing so develop a high adhesion. Moreover, the bonds produced therewith are to have good shear strength even at elevated temperatures, high resistance to heat and humidity, and high bond strength under dynamic loading, the latter in particular at low temperatures. Lastly, a sustained mechanical load on the bonds is not to result in dewetting of the adhesive tape from the surface.

The achievement of the object is based on the idea of providing foamed carriers with dual-crosslinked poly(meth) acrylate PSAs. A first and general subject of the invention is therefore an adhesive tape which comprises at least one foamed layer and at least one pressure-sensitive adhesive layer, where the pressure-sensitive adhesive layer comprises at least one poly(meth)acrylate and the poly(meth)acrylate is crosslinked with at least one covalent and at least one coordinative crosslinker.

BRIEF DESCRIPTION OF THE DRAWINGS

The invention will now be described in greater detail with reference to the drawings, wherein.

Figure 1:
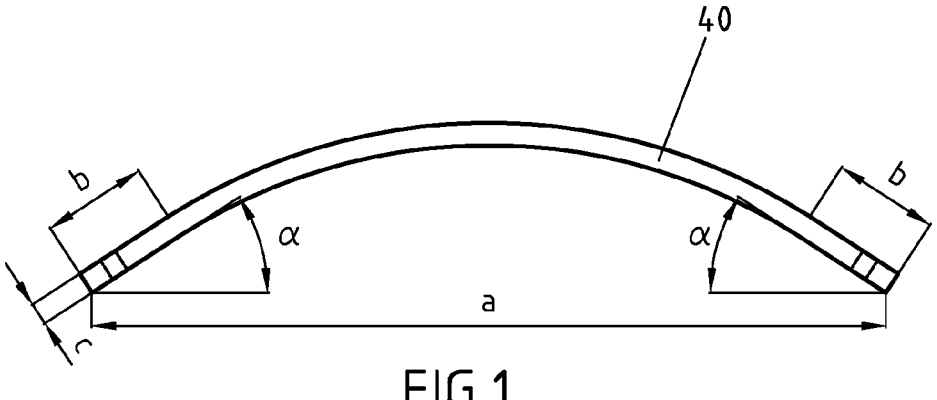
FIG. 1 is a side view of a PC plate with an adhesive tape specimen/aluminum strip assembly bonded thereon.

Adhesive tapes of the invention are notable in particular for rapid wetting and for high dewetting resistance (repulsion resistance) on low-energy surfaces, even under a sustained mechanical load on the bond, and also for good technical adhesive properties otherwise.

The foamed layer preferably comprises to an extent of at least 50 wt %, more preferably at least 70 wt %, very preferably at least 80 wt %, more particularly at least 90 wt %, based in each case on the total weight of the foamed layer, at least one polymer selected from the group consisting of rubbers, more particularly natural rubbers, polyurethanes, poly(meth)acrylates and styrene block copolymers, and also blends of the stated polymers. More preferably the foamed layer comprises one or more poly(meth)acrylates to an extent of at least 50 wt %, more preferably at least 70 wt %, very preferably at least 80 wt %, more particularly at least 90 wt %, based in each case on the total weight of the foamed layer.

A "poly(meth)acrylate" is a polymer obtainable by radical polymerization of acrylic and/or methacrylic monomers and also, optionally, further, copolymerizable monomers. More particularly a "poly(meth)acrylate" is a polymer whose monomer basis consists to an extent of at least 50 wt % of acrylic acid, methacrylic acid, acrylic esters and/or methacrylic esters, with acrylic esters and/or methacrylic esters being present at least proportionally, preferably to an extent of at least 30 wt %, based on the overall monomer basis of the polymer in question.

More particularly the foamed layer comprises to an extent of at least 50 wt %, more preferably at least 70 wt %, very preferably at least 80 wt %, more particularly at least 90 wt %, based in each case on the total weight of the foamed layer, of at least one poly(meth)acrylate A which is derivable from the following monomer composition:

a1) 40 to 77 wt % of at least one (meth)acrylic ester having a homopolymer glass transition temperature of not more than $-40°$ C. and an alcohol component based on a branched, primary alcohol;

a2) 20 to 40 wt % of at least one (meth)acrylic ester whose alcohol component is based on a linear $C_1$-$C_{18}$ alcohol;

a3) 0 to 20 wt % of at least one (meth)acrylic ester whose alcohol component is based on a cyclic alcohol;

a4) 3 to 20 wt % of acrylic acid.

The polymers present in the foamed layer, particularly so the polymer A, preferably have/has a weight-average molecular weight $M_w$ of at least 500 000 g/mol, more preferably of at least 700 000 g/mol. Likewise preferably, the polymers present in the foamed layer have a weight-average molecular weight $M_w$ of not more 1 700 000 g/mol. The polydispersity PD, being the breadth of the molar mass distribution, determined as a ratio of the weight-average molecular weight $M_w$ to the number-average molecular weight $M_n$, for the polymers present in the foamed layer is preferably 10≤PD≤100, more preferably 20≤PD≤80.

The foamed layer is preferably crosslinked thermally, leading to a very homogeneous development of this layer. With particular preference the foamed layer is crosslinked thermally by at least one glycidyl ether, more particularly at least one 3-glycidyloxypropyltrialkoxysilane and/or a polyglycidyl ether, very preferably at least by 3-glycidyloxypropyltriethoxysilane and/or pentaerythritol tetraglycidyl ether. The foamed layer is crosslinked preferably in combination with an amine, more preferably with 3-aminopropyltriethoxysilane and/or isophoronediamine, as accelerator.

The fraction of the entirety of the crosslinkers in the foamed layer for crosslinking is preferably up to 1 wt %, more preferably up to 0.8 wt %, more particularly 0.05 to 0.6 wt %, and very preferably 0.1 to 0.5 wt %, based in each case on the total amount of the polymers for crosslinking.

The fraction of the entirety of the accelerators in the foamed layer for crosslinking is preferably 0.1 to 1.5 wt %, more preferably 0.15 to 1.2 wt %, based in each case on the total amount of the polymers for crosslinking.

The presence of an amine accelerator in the foamed layer is not critical especially in the case of three-layer or multi-layer constructions, since in these constructions the foamed layer acts as a carrier layer and is therefore largely shielded from the effect of oxidizing substances such as atmospheric oxygen, for instance, by the outer-lying layers of adhesive/PSA.

The foamed layer may in principle have been foamed in any desired way. For example, the foamed layer may have been foamed by means of a propellant gas which is introduced into it or released within it. Introduced propellant gas includes, for example, $CO_2$ or $N_2$, possibly also in the form of a supercritical fluid.

The release of a propellant gas may alternatively be accomplished by means of a blowing agent which breaks down thermally and releases gas in the process, examples being $NaHCO_3$, the free acids or derivatives of citric acid, ascorbic acid, fumaric acid, gluconic acid or lactic acid, or exothermic blowing agents such as azodicarbonamide.

Also suitable is mechanical foaming (frothing).

The foamed layer preferably comprises at least one foaming agent selected from the group consisting of hollow polymer spheres, solid polymer spheres, hollow glass spheres, solid glass spheres, hollow ceramic spheres, solid ceramic spheres, and solid carbon spheres. More preferably the foamed layer comprises at least partially expanded hollow microspheres. These are at least partially expanded microspheres which in their basic state are elastic and expandable and have a thermoplastic polymer shell. These spheres—in the basic state—are filled with low-boiling liquids or liquified gas. Shell material used is, in particular, polyacrylonitrile, PVDC, PVC or polyacrylates. Common low-boiling liquids are, in particular, hydrocarbons of the lower alkanes, as for example isobutane or isopentane, which are enclosed in the form of liquified gas under pressure in the polymer shell. For microspheres of this kind the term "microballoons" is also customary.

Exposure of the microballoons to heat causes the outer polymer shell to soften. At the same time, the propellant gas in liquid form within the shell undergoes transition to its gaseous state. When this occurs, the microballoons stretch irreversibly and undergo three-dimensional expansion. Expansion is at an end when the internal and external pressures match one another. Since the polymeric shell is retained, the result is a closed-cell foam.

A multiplicity of types of microballoon are available commercially, and differ essentially in their size (6 to 45 μm in diameter in the unexpanded state) and in the onset temperatures they require for expansion (75 to 220° C.). Unexpanded microballoon types are also available in the form of a aqueous dispersion having a solids fraction or microballoon fraction of around 40 to 45 wt %, and additionally in the form of polymer-bound microballoons (masterbatches), for example in ethylene-vinyl acetate with a microballoon concentration of around 65 wt %. Like the unexpanded microballoons, both the microballoon dispersions and the masterbatches are suitable as such for producing the foamed layer.

The foamed layer may also be produced using what are called preexpanded hollow microspheres. With this group, the expansion takes place prior to incorporation into the polymer matrix.

The term "at least partially expanded hollow microspheres" is understood in the invention to mean that the hollow microspheres have undergone expansion at least to a degree such as to bring about a reduction in the density of the layer in question to a technically meaningful extent by comparison with the same layer containing the unexpanded hollow microspheres. This means that the microballoons need not necessarily have undergone complete expansion. The "at least partially expanded hollow microspheres" have preferably expanded in each case to at least twice their maximum extent in the unexpanded state.

The expression "at least partially expanded" relates to the state of expansion of the individual hollow microspheres and is not intended to mean that only some of the hollow microspheres in question must have undergone (initial) expansion. If, therefore, there are "at least partially expanded hollow microspheres" and unexpanded hollow microspheres present in the foamed layer, this means that unexpanded (totally unexpanded, in other words having not undergone even initial expansion) hollow microspheres do not belong to the "at least partially expanded hollow microspheres".

The foamed layer may comprise silica, preferably precipitated silica surface-modified with dimethyldichlorosilane. This is advantageous since it allows the thermal shear strength of the layer to be adjusted, and more particularly increased. Silicas, furthermore, can be used outstandingly for transparent layers. Silica is present in the foamed layer preferably of up to 15 wt %, based on the entirety of all the polymers present in the foamed layer.

The foamed layer may also comprise at least one plasticizer. The plasticizer is preferably selected from the group consisting of (meth)acrylate oligomers, phthalates, cyclohexanedicarboxylic esters (e.g., Hexamoll® DINCH, from BASF), water-soluble plasticizers, plasticizing resins, phosphates (e.g., Levagard® DMPP, from Lanxess) and polyphosphates.

A pressure-sensitive adhesive is understood in the invention, as is customary in the general usage, as a material which in particular at room temperature is permanently tacky and also adhesive. A characteristic of a pressure-sensitive adhesive is that it can be applied by pressure to a substrate and remains adhering there, with no further definition of the pressure to be applied or the period of exposure to this pressure. In some cases, dependent on the precise nature of the pressure-sensitive adhesive and also on the substrate, the temperature and the atmospheric humidity, the influence of a minimal pressure of short duration, which does not go beyond gentle contact for a brief moment, is enough to achieve the adhesion effect, while in other cases a longer-term period of exposure to a high pressure may also be necessary.

Pressure-sensitive adhesives have particular, characteristic viscoelastic properties which result in the permanent tack and adhesiveness. A feature of these adhesives is that when they are mechanically deformed, there are processes of viscous flow and there is also development of elastic forces of recovery. The two processes have a certain relationship to one another in terms of their respective proportion, in dependence not only on the precise composition, the structure and the degree of crosslinking of the pressure-sensitive adhesive, but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high pressure sensitive adhesiveness (also referred to as tack or surface stickiness) and hence often also in high adhesion. Highly crosslinked systems, crystalline polymers, or polymers with glasslike solidification lack flowable components and are in general devoid of tack or possess only little tack at least.

The proportional elastic forces of recovery are necessary for the achievement of cohesion. They are brought about, for example, by very long-chain macromolecules with a high degree of coiling, and also by physically or chemically crosslinked, in particular irreversibly crosslinked, macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle $\delta$.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)\cdot\sin(\delta)$ (r=shear stress, $\gamma$=deformation, $\delta$=phase angle=phase shift between shear stress vector and deformation vector).

A composition is considered in general to be a pressure-sensitive adhesive, and is defined as such for the purposes of the invention, when at room temperature, in this case by definition at 23° C., in the deformation frequency range from $10^0$ to $10^1$ rad/sec, both G' and G" are situated at least partly in the range from $10^3$ to $10^7$ Pa. "Partly" means that at least a section of the G' curve lies within the window subtended by the deformation frequency range from $10^0$ inclusive up to $10^1$ inclusive rad/sec (abscissa) and by the G' value range from $10^3$ inclusive to $10^7$ inclusive Pa (ordinate), and that at least a section of the G" curve is likewise situated within the corresponding window.

The PSA layer of the adhesive tape of the invention preferably comprises at least one poly(meth)acrylate B which is derivable from the following monomer composition:

b1) 55 to 75 wt % of at least one (meth)acrylic ester having a homopolymer glass transition temperature of not more than −40° C. and an alcohol component based on a branched, primary alcohol;

b2) 20 to 40 wt % of at least one (meth)acrylic ester whose alcohol component is based on a linear $C_1$-$C_{18}$ alcohol;

b3) 5 to 15 wt % of acrylic acid.

The poly(meth)acrylate of the PSA layer preferably has a weight-average molecular weight $M_w$ of at least 500 000 g/mol, more preferably of at least 700 000 g/mol. Likewise preferably, the poly(meth)acrylate of the PSA layer has a weight-average molecular weight $M_w$ of not more than 1 700 000 g/mol. The polydispersity PD, being the breadth of the molar mass distribution, determined as a ratio of the weight-average molecular weight $M_w$ to the number-average molecular weight $M_n$, for the poly(meth)acrylate of the PSA layer is preferably $10 \leq PD \leq 100$, more preferably $20 \leq PD \leq 80$.

Crosslinking of polymers refers in particular to a reaction in which numerous initially linear or branched macromolecules are linked, by formation of bridges between the individual macromolecules, to form a more or less branched network. Bridging is accomplished here in particular by reaction of suitable chemical molecules—known as crosslinkers or crosslinker substances—with the macromolecules, as for example with certain functional groups of the macromolecules that are particularly amenable to attack by the respective crosslinker molecule. The sites of the crosslinker molecule that attack the macromolecules are referred to generally as "reactive centers". Crosslinker molecules may link two macromolecules to one another, by a single crosslinker molecule reacting with two different macromolecules, thus possessing, in particular, at least two reactive centers; alternatively, they may have more than two reactive centers, in which case a single crosslinker molecule can also link three or more macromolecules to one another. Possible secondary reactions include intramolecular reactions, when a single crosslinker molecule attacks a single macromolecule with at least two of its reactive centers. In the sense of effective crosslinking with the polymer, such secondary reactions are generally unwanted.

The poly(meth)acrylate of the PSA layer of the adhesive tape of the invention is crosslinked with two different kinds of crosslinkers, namely 1) with at least one covalent crosslinker—these are crosslinkers which subject the macromolecules for linking to covalent attack and hence form a covalent chemical bond between their corresponding reactive center and the site of attack—in particular the functional group— on the macromolecule. Suitable in principle for this purpose are all conceivable chemical reactions that form covalent bonds.

2) with at least one coordinative crosslinker—these are crosslinkers which subject the macromolecules for linking to coordinative attack and so form a coordinative bond between their corresponding reactive center and the site of attack—in particular, the functional group—on the macromolecule. Suitable in principle for this purpose are all conceivable chemical reactions that form coordinative bonds.

The covalent crosslinker of the PSA layer of the adhesive tape of the invention is preferably selected from the group consisting of in each case polyfunctional glycidylamines, epoxides, including, in particular, epoxide-functionalized organosilanes, aziridines, and isocyanates.

Preferred polyfunctional glycidylamines are N,N,N', N'tetrakis(2,3-epoxypropyl)cyclohexane-1,3-dimethylamine (e.g., syna Epoxy S610, synasia) and N,N,N',N'-tetrakis (2,3-epoxypropyl)-m-xylene-a,a'-diamine (e.g., Erisys GA-240, CVC).

Preferred polyfunctional epoxides are epoxycyclohexylcarboxylate-2,2-bis(hydroxymethyl)-1,3-propanediol and (3,4-epoxycyclohexane)methyl 3,4-epoxycyclohexylcarboxylate, and also epoxide-functionalized organosilanes, especially (3-glycidyloxypropyl)trimethoxysilane (GLYMO) and (3-glycidyloxypropyl)triethoxysilane (GLYEO).

A preferred polyfunctional aziridine is trimethylolpropane tris(2-methyl-1-aziridinepropionate).

Preferred isocyanates are toluene diisocyanate (TDI), 2,4-toluene diisocyanate dimer, naphthylene 1,5-diisocyanate (NDI), o-toluene diisocyanate (TODI), diphenylmethane diisocyanate (MDI), triphenylmethane triisocyanate, tris (p-isocyanatephenyl) thiophosphite, and polymethylenepolyphenyl isocyanate.

More preferably the covalent crosslinker comprises at least one compound containing at least one cyclic ether function, more particularly at least two cyclic ether functions.

The invention uses at least one covalent crosslinker, although the use of two or more covalent crosslinkers is also possible, namely not only two or more crosslinkers from one class of compound but also combinations of covalent crosslinkers from different classes of compound.

The coordinative crosslinker of the PSA layer of the adhesive tape of the invention is preferably selected from chelate compounds, more particularly from polyvalent metal chelate compounds. The term "polyvalent metal chelate compounds" refers to those compounds wherein a polyvalent metal is bonded coordinatively to one or more organic compounds. More preferably the coordinative crosslinker is a polyvalent metal chelate compound whose polyvalent metal ion is selected from the group consisting of Al(III), Zr(IV), Co(II), Cu(I), Cu(II), Fe(II), Fe(III), Ni(II), V(II), V(III), V(IV), V(V), Zn(II), In(III), Ca(II), Mg(II), Mn(II), Y(III), Ce(II), Ce(IV), St(II), Ba(II), Mo(II), Mo(IV), Mo(VI), La(III), Sn(II) Sn(IV) and Ti(IV), more particularly from the group consisting of Al(III), Zr(IV) and Ti(IV).

Ligands of the coordinative crosslinkers may in principle be all known ligands. The atoms utilized for the coordinative bonding of the organic compound, however, are more particularly those atoms which have free electron pairs, such as, for example, oxygen atoms, sulfur atoms, nitrogen atoms, and the like. The organic compound or compounds of the coordinative crosslinker are preferably selected from the group consisting of alkyl esters, alcohols, carboxylic acids, ethers, and ketones. More preferably the coordinative crosslinker of the PSA layer of the adhesive tape of the invention is selected from the group consisting of titanium dipropoxide bis(acetylacetonate), titanium dibutoxide bis(octylene glycolate), titanium dipropoxide bis(ethyl acetoacetate), titanium dipropoxide bis(lactate), titanium dipropoxide bis(triethanolaminate), titanium di-n-butoxide bis(triethanolaminate), titanium tri-n-butoxide monostearate, butyl titanate dimer, poly(titanium acetylacetonate), aluminum diisopropoxide monoethyl acetate, aluminum di-n-butoxide monomethyl acetoacetate, aluminum diisobutoxide monomethyl acetoacetate, aluminum di-n-butoxide monoethyl acetoacetate, aluminum di-sec-butoxide monoethyl acetoacetate, aluminum triacetylacetonate, aluminum monoacetylacetonate bis(ethyl acetoacetate), and zirconium tetraacetylacetonate; more particularly from aluminum triacetylacetonate and aluminum diisopropoxide monoethyl acetate.

In the invention at least one coordinative crosslinker is used; however, it is also possible for two or more coordinative crosslinkers to be employed, specifically not only two or more crosslinkers from one class of compound but also combinations of coordinative crosslinkers from different classes of compound.

With preference, before the start of crosslinking, covalent crosslinkers and coordinative crosslinkers are present in the PSA layer in a proportion such that the functional groups of the covalent crosslinkers are present in a molar excess, based on the binding sites of the coordinative crosslinkers. More preferably the molar ratio of the functional groups of the covalent crosslinkers to the binding sites of the coordinative crosslinkers—that is, the ratio of the amount of substance $n_{cov}$ used of the functional groups of the covalent crosslinkers to the amount of substance $n_{coord}$ used of the binding sites of the coordinative crosslinkers—is 3:1 to 9:1, accordingly $3 \le n_{cov}/n_{coord} \le 9$, more particularly 4.5:1 to 8.5:1.

The PSA layer of the adhesive tape of the invention may comprise one or more plasticizers. The plasticizers are preferably selected from the group consisting of (meth) acrylate oligomers, phthalates, cyclohexanedicarboxylic esters (e.g., Hexamoll® DINCH, from BASF), water-soluble plasticizers, plasticizing resins, phosphates (e.g., Levagard® DMPP, from Lanxess), and polyphosphates.

In the structure of the adhesive tape of the invention there is preferably a PSA layer on both sides of the foamed layer, with at least one of the PSA layers having been crosslinked in accordance with the invention.

With particular preference a PSA layer crosslinked in accordance with the invention is disposed on both sides of the foamed layer. This is advantageous since in this case both sides of the adhesive tape have the very good technical adhesive properties of the inventively crosslinked PSA layer. In this case more particularly the two PSA layers comprise identical concentrations of identical additions—for example, functional additions and/or fillers. It is also possible for both PSA layers to be free from functional additions and/or fillers.

In one embodiment there is an inventively crosslinked PSA layer disposed on both sides of the foamed layer, and the PSA layers are identical chemically, physically and/or in their dimensions. More particularly, both PSA layers are completely identical, disregarding insignificant discrepancies, of the kind that may result, for example, from impurities within the universal concentration, from production-related imprecisions, and from other, similar sources.

Not only the foamed layer—provided one of its surfaces is exposed—but also the one or both PSA layers may be stabilized and/or protected with a release liner or otherwise with a conventional film material. A release liner or a film material otherwise, however, is not considered part of the adhesive tape of the invention, being regarded merely as an aid to the storage, transport, etc. of such a tape.

In embodiments of the adhesive tape of the invention in which one surface of the foamed layer is exposed, it is possible, given sufficient thickness of the foamed layer, for this side of the foamed layer, which is facing away from the PSA layer and is therefore exposed, to be stabilized by strong crosslinking using a crosslinking process with a low depth of penetration, so that only part of the foamed layer is strongly crosslinked, whereas, on the other side of the foam—the side facing the PSA layer—the properties originally present, more particularly viscoelastic properties, are retained.

Not only the poly(meth)acrylates contained in the PSA layer but also those contained in the foamed layer of the adhesive tape of the invention may be prepared preferably by free radical polymerization, more preferably in solution, in accordance with the prior art. In the case of any subsequent processing from the melt, the solvent is stripped off after the polymerization.

The foamed layer is preferably shaped into the layer from the melt. In this case, preferably, there is thermal crosslinking of the foamed layer. The PSA layers as well can be shaped from the melt. However, given that these layers are typically produced only in thicknesses of up to about 100 μm, they may also outstandingly be coated from solution and dried thereafter.

In technical process terms, very thick polymer layers such as the foamed layer of the adhesive tape of the invention can be produced very much more effectively from the melt (in what is called a hotmelt process) than from the polymer solution. Regarding the definition of a melt of an amorphous polymer—such as of a polyacrylate, for example—the invention uses the criteria specified in F. R. Schwarzl, Polymermechanik: Struktur und mechanisches Verhalten von Polymeren [Polymer mechanics: Structure and mechanical behavior of polymers], Springer Verlag, Berlin, 1990, according to which the viscosity has an order of magnitude of at most $\eta \approx 10^4$ Pa·s and the internal damping attains tan δ values of $\geq 1$.

If the foamed layer and also, where appropriate, the PSA layers of the adhesive tape of the invention are produced by coating from the melt, a problem arises that results from the preferred thermal crosslinking. On the one hand, in order to initiate subsequent thermal crosslinking, the thermal crosslinkers must be added prior to coating; on the other hand, in that case, the crosslinkers are then exposed to high temperatures for generating and maintaining the polymer melt. Even before the onset of controlled crosslinking, this may result in uncontrolled crosslinking of polymer (referred to as gelling). In order as far as possible to suppress this gelling, the hotmelt process typically uses crosslinkers which are very slow to react, and only uses them shortly prior to coating. In order nevertheless to achieve satisfactory crosslinking outcomes after coating, moreover, what are known as accelerators are frequently admixed.

For polymer systems which are coated from solution and are to be crosslinked thermally, as well, the use of accelerators may make sense and is frequently practiced. The thermally initiated crosslinking procedure is customarily associated with the thermal removal of the solvent from the applied layer (i.e. the drying of the layer of composition). Excessively rapid removal of the solvent here leads to a poorly formed, uneven and inhomogeneous layer, as a result of blistering, for example. For this reason, drying is carried out preferably at moderate temperatures. In order nevertheless to guarantee effective crosslinking proceeding with sufficient rapidity, accelerators are customarily added to the solvent systems as well.

Coating from solution is frequently preferred when the thickness of the resulting layers is not very great, meaning that there are significant problems associated with increased viscosity of a polymer melt to be applied, in comparison to a polymer solution.

In the invention the foamed layer is crosslinked preferably with the aid of accelerators. As accelerators or else substance with an accelerating effect, use is made in particular of proton acceptors, electron pair donors (Lewis bases) and/or electron pair acceptors (Lewis acids). Accelerators are compounds or chemicals which support crosslinking reactions by ensuring a sufficient reaction rate in accordance with the technical objective. This is accomplished, in particular, catalytically (by activation of the crosslinking reaction) and/or by conversion of functional groups in the crosslinker substances or in the macromolecules to be crosslinked into functional groups which are able to react in such a way as to link the macromolecules to one another (bridging, network formation) or via the crosslinker substances to other functional groups.

The accelerators themselves do not participate in a linking reaction of this kind—that is, they do not themselves crosslink—but are able to be incorporated into the network or attached to it, in the form of reaction products or fragments. An accelerator thus ensures a substantial improvement in the reaction kinetics of the crosslinking reaction.

Given selected reaction parameters—in accordance with the invention, in particular, a temperature below the processing temperature of the polymers in the foamed layer— the crosslinking reaction would not proceed, or would proceed only at an insufficient rate, in the absence of an accelerator. For example, many epoxides which are used as crosslinkers for polyacrylates are inherently relatively slow to react, and so without accelerators do not produce satisfactory crosslinking outcomes.

Proton donors, especially carboxylic acids and/or carboxylic acid groups and/or deprotonated derivatives thereof, are not counted as accelerators in the sense of the invention.

The presence of accelerators in the PSA layers does indeed also have drawbacks. For instance, nitrogen-containing accelerators in particular, such as amines, for example, tend to yellow over time as a result of oxidation processes, meaning that accelerator systems of this kind are poorly suited or unsuited in particular to transparent PSAs or multilayer pressure-sensitive adhesive tapes which are to be used in particular for optical purposes. Moreover, basic or acidic accelerators may also lead over time to corrosion of the bond substrate.

In the invention, therefore, the aim is to achieve thermal crosslinking of the PSA layers, especially those in contact with air, with the aforementioned covalent and coordinative crosslinkers which are sufficiently reactive to make it unnecessary to admix any accelerator. With preference, therefore, the PSA layer or layers of the adhesive tape of the invention are crosslinked without accelerators and/or are free from substances that accelerate the crosslinking. The absence of accelerators here relates in particular to externally added accelerators, in other words accelerators which are not copolymerized and/or incorporated into the polymer framework. More preferably, however, the PSA layer or layers contain neither externally added nor copolymerized accelerators, and in particular they contain no accelerators at all.

The foamed layer and the one or two PSA layers may be thermally crosslinked simultaneously, if, for instance, the PSA layers are applied to the as yet uncrosslinked foamed layer, or the layers are shaped jointly in a specific process.

It is also possible, however, for the individual layers to be thermally crosslinked in separate processes, if, for instance, the PSAs are coated onto the foamed layer which has already been thermally crosslinked, and are then thermally crosslinked, or if the PSAs are shaped and thermally crosslinked elsewhere—on a temporary carrier material, for instance—and then laminated onto the foamed layer which has already been crosslinked. For this purpose in particular it may be of advantage to subject the foamed layer and/or the PSA layer(s) to chemical and/or physical pretreatment: for example, corona and/or plasma treatment and/or reactive corona and/or reactive plasma treatment, using gases such as nitrogen, oxygen, fluorine and/or others, for example, and/or flame treatment.

Single- or double-sided, especially three-layer, adhesive tapes of the invention can be produced as set out for three-layer/multilayer systems in EP 1 802 722 A1. The production and coating methods described therein may also be employed analogously for the adhesive tapes described in the present specification; the disclosure content of EP 1 802 722 A1 is therefore explicitly included in the present disclosure content. The same applies to the description of the product constructions in EP 1 802 722 A1.

Foaming with microballoons in order to produce the foamed layer takes place preferably in accordance with the methods described in EP 2 414 143 A1 and DE 10 2009 015 233 A1.

The foamed layer of the adhesive tape of the invention may be regarded as a liquid of very high viscosity which under compressive load exhibits flow behavior (also referred to as "creep"). Viscoelastic compositions generally have the capacity, simply through the force of gravity, in other words under loading resulting from their intrinsic weight, of flowing more or less slowly, and in particular of flowing onto a substrate/wetting a substrate. At the least, however, this effect occurs under an additional external pressure. Any increase in pressure, resulting from the adhesive tape being pressed onto a substrate, for instance, may significantly accelerate this behavior.

A further capacity possessed by viscoelastic compositions, under slow exposure to force, is to relax the forces which are acting on them. They are therefore capable of dissipating the forces into vibrations and/or deformations, which may also—at least partly—be reversible, and hence of "buffering" the acting forces and of frequently preventing mechanical destruction, or at least reducing such destruction or delaying the time of onset of the destruction. In the event of a very fast-acting force, viscoelastic compositions typically exhibit elastic behavior, in other words the behavior of fully reversible deformation, and forces which exceed the elasticity of the composition may result in fracture.

In contrast to these are elastic materials, which exhibit the described elastic behavior even under slow exposure to force. Elastic behavior, fundamentally, has adverse consequences for the wetting. The PSA layers of the invention as well, in spite of a pronounced elastic behavior, overall exhibit predominantly a pronounced viscoelastic behavior under rapid exposure to force; in particular, over a long time scale, their behavior tends to be viscous, like a fluid, and so optimum and, in particular, rapid wetting is achieved.

Adhesive tapes of the invention, especially double-sided tapes, have a series of specific advantages, generally and in the embodiments described above:

As a result of the thermal crosslinking, the adhesive tapes do not have a crosslinking profile through their layers. Viscoelastic layers or PSA layers crosslinked by actinic radiation (ultraviolet radiation, electron beams) exhibit a crosslinking profile through the respective crosslinked layer. Thermally crosslinked layers of composition do not exhibit this behavior, since the heat is able to penetrate the layer uniformly.

By virtue of the combination of covalent and coordinative crosslinkers in accordance with the invention, thermally crosslinked PSAs have a higher peel adhesion and/or more rapid attainment of the ultimate peel adhesion, and also better thermal shear strength, than systems crosslinked using other crosslinkers. This finding is highly significant for the adhesive tapes of the invention. Where a foamed, poly (meth)acrylate-based carrier is used and is furnished on at least one side with a PSA crosslinked in accordance with the invention, not only the peel adhesion forces but also the wetting behavior are better on this adhesive tape side than in the case of systems which have the corresponding PSA on a more elastic polymer carrier (conventional foam carrier such as one based on PE, for example), or which have the same foamed carrier, but a different, albeit significantly more tacky, PSA.

The peel adhesion of an adhesive tape of the invention is determined not only by the outer layer of PSA but also, equally, by the foamed layer, and so the overall system is significant for the outstanding adhesive properties. The concept on which the adhesive tapes of the invention are based therefore comprises the combination of a relatively soft foam layer with a PSA layer crosslinked both covalently and coordinatively. As a result, through the interaction of the two layers, the adhesive performance is significantly better than in the case of adhesive tapes with differently crosslinked PSA layers or with elastic carriers.

Beyond the layers described so far, the adhesive tapes of the invention may comprise further layers, hence forming multilayer systems having a layer sequence of greater than three. It is advantageous if in this case the foamed layer is furnished directly, or at least indirectly, with a PSA layer of the invention, since in that case the above-described technical adhesive advantages are realized. More preferably an adhesive tape of the invention consists of the foamed layer and of one or two PSA layers crosslinked in accordance with the invention.

A feature of adhesive tapes of the invention is that they can be produced as very thick products which also possess very high peel adhesion. Such products find application, for example, in adhesive bonds which are required to compensate unevennesses or cavities, in the building sector or in the automobile industry, for example.

On account of the good relaxation behavior of the foamed layer, adhesive tapes of the invention are suitable for absorbing forces such as mechanical stresses, impacts and the like and of dissipating the energy of such forces. Adhesive tapes of the invention are therefore particularly suitable for applications requiring an impact-damping and/or vibration-damping effect, as in the bonding, for instance, of fragile articles in electronic products. A particular advantage is to employ adhesive tapes of the invention when materials having different coefficients of thermal expansion are to be bonded to one another, since the adhesive tapes of the invention, by virtue of their relaxation capacity, are able to dissipate stresses resulting from the different expansion behavior of the surfaces or articles bonded to each other. Conversely, conventional adhesive tapes frequently fail when the articles bonded differ greatly in their expansion behaviors, with consequent weakening or even fracture of the bond site.

Adhesive tapes of the invention can be produced in customary adhesive tape thicknesses of several to several hundred micrometers, but more advantageously in thicknesses of more than 300 μm, as for example 500 μm or more, 1000 μm or more, 1500 μm or more, 2000 μm or more, or even 3000 μm or more. Products even thicker can also be realized.

In an adhesive tape of the invention the foamed layer preferably has a layer thickness of 300 to 2500 μm, more preferably of 400 to 2400 μm, and the at least one PSA layer preferably has a layer thickness of 40 to 150 μm, more preferably of 50 to 100 μm.

Adhesive tapes of the invention are also especially suitable for the bonding and securing of decorative trim, badges and fenders on vehicles. If needed, these surfaces can also be treated with a primer prior to bonding, in order to boost the bond strength further.

Further areas of application for which adhesive tapes of the invention are outstandingly suited are, for example, the construction or extension of buildings, the equipping of buildings, and the architectural sector (both inside and out), the DIY sector, model construction, furniture making, ship building and aircraft construction, the electronic and electrical industries (for consumer electronics, white goods, brown goods, and red goods as well in view of the high thermal stability, for example) and also for traffic (road signage and the like).

EXAMPLES

Measurement Methods

Solids Content (Measurement Method A1):

The solids content is a measure of the fraction of unvaporizable constituents in a polymer solution. It is determined gravimetrically, with the solution being weighed, then the vaporizable fractions evaporated off in a drying cabinet at 120° C. for 2 hours, and the residue being weighed again.
K Value (According to FIKENTSCHER) (Measurement Method A2):

The K value is a measure of the average molecule size in high-polymer compounds. For the measurement, one percent strength (1 g/100 ml) toluenic polymer solutions were prepared, and their kinematic viscosities were determined using a VOGEL-OSSAG viscometer. Following standardization to the viscosity of toluene, the relative viscosity is obtained, and can be used to calculate the K value according to FIKENTSCHER (Polymer 8/1967, 381 ff.).
Gel Permeation Chromatography GPC (Measurement Method A3):

The data in this specification for the weight-average molecular weight $M_w$ and the polydispersity PD are based on a determination by gel permeation chromatography. The determination takes place on 100 μl of a sample that has undergone clarifying filtration (sample concentration 4 g/l). The eluent used is tetrahydrofuran with 0.1 vol % of trifluoroacetic acid. Measurement takes place at 25° C. The precolumn used is a PSS-SDV column, 5 μ, $10^3$ Å, ID 8.0 mm·50 mm. Separation takes place using the columns PSS-SDV, 5 μ, $10^3$ Å and also $10^5$ Å and $10^6$ Å, each of ID 8.0 mm×300 mm (columns from Polymer Standards Service; detection using Shodex RI71 differential refractometer). The flow rate is 1.0 ml per minute.
Calibration Takes Place Against PMMA Standards (Polymethyl Methacrylate Calibration).

Density determination from the coatweight and the layer thickness (measurement method A4): The weight per unit volume or density ρ of a coated self-adhesive composition is determined by the ratio of surface weight to respective layer thickness:

$$\rho = \frac{m}{V} = \frac{MA}{d} \quad [\rho] = \frac{[kg]}{[m^2] \cdot [m]} = \left[\frac{kg}{m^3}\right]$$

MA=Coatweight/surface weight (without liner weight) in [kg/m²]
d=Layer thickness (without liner thickness) in [m]
This method produces the unadjusted density.

This density determination is suitable in particular for determining the total density of finished products, including multilayer products.
90° Peel Adhesion to Steel—Open and Lined Side (Measurement Method M1):

The peel adhesion to steel is determined under test conditions of 23° C.+/−1° C. temperature and 50%+/−5% relative humidity. The specimens were trimmed to a width of 20 mm and adhered to a steel plate. Prior to the measurement, the steel plate was cleaned and conditioned. This was done by first wiping the plate with acetone and then leaving it to stand in the air for 5 minutes to allow the solvent to evaporate.

The side of the three-layer assembly facing away from the test substrate was then lined with a 50 μm aluminum foil, so preventing the specimen from stretching during the measurement. The test specimen was subsequently rolled onto the steel substrate. This was done by running a 2 kg roller back and forth over the tape five times at a rolling velocity of 10 m/min. Immediately after rolled application, the steel plate was inserted into a special mount which allows the specimen to be pulled off upward at an angle of 90°. The peel adhesion was measured using a Zwick tensile testing machine. When the lined side was applied to the steel plate, the open side of the three-layer assembly is first laminated to the 50 μm aluminum foil, the release material is removed, and the specimen is adhered to the steel plate, rolled down analogously, and subjected to measurement.

The measurement results for both sides, open and lined, are reported in N/cm as averages from three measurements.
Holding Power—Open and Lined Side (Measurement Method M2):

The specimens were prepared under test conditions of 23° C.+/−1° C. temperature and 50%+/−5% relative humidity. The test specimen was trimmed to 13 mm and adhered to a steel plate. The bond area was 20 mm·13 mm (length·width). Prior to the measurement, the steel plate was cleaned and conditioned. This was done by first wiping the plate with acetone and then leaving it to stand in the air for 5 minutes to allow the solvent to evaporate. After bonding, the open side was reinforced with a 50 μm aluminum foil and rolled over twice back and forth using a 2 kg roller. A belt loop was then mounted on the protruding end of the three-layer assembly. The structure was subsequently suspended from a suitable apparatus and loaded with a defined weight; the weight is specified in each of the examples. The suspension apparatus was such that the weight loaded the sample at an angle of 179°+/−1°. This ensured that the three-layer assembly was not able to peel off from the lower edge of the plate. The holding power measured, being the time between the suspending of the specimen and its falling off, is reported in minutes and corresponds to the mean value from three measurements. For the measurement of the lined side, the open side is first reinforced with the 50 μm aluminum foil, the release material is removed, and adhesion to the test plate takes place in analogy to the manner described. The measurement was conducted under standard conditions (23° C., 55% humidity).

Name-Plate Test (NPT) (Measurement Method M3):

An aluminum test strip 2 cm wide, 15 cm long and 0.5 mm thick is washed with acetone and left to stand under conditions of 23° C.+/−1° C. temperature and 50%+/−5% relative humidity for 5 minutes. The aluminum strip is then applied lengthwise to the adhesive tape specimen. Protruding adhesive tape is then cut off, so that the tape ends flush with the a=211 mm;

b=28 mm;

c=6 mm.

The size of the angle α is 33°.

Figure 2:
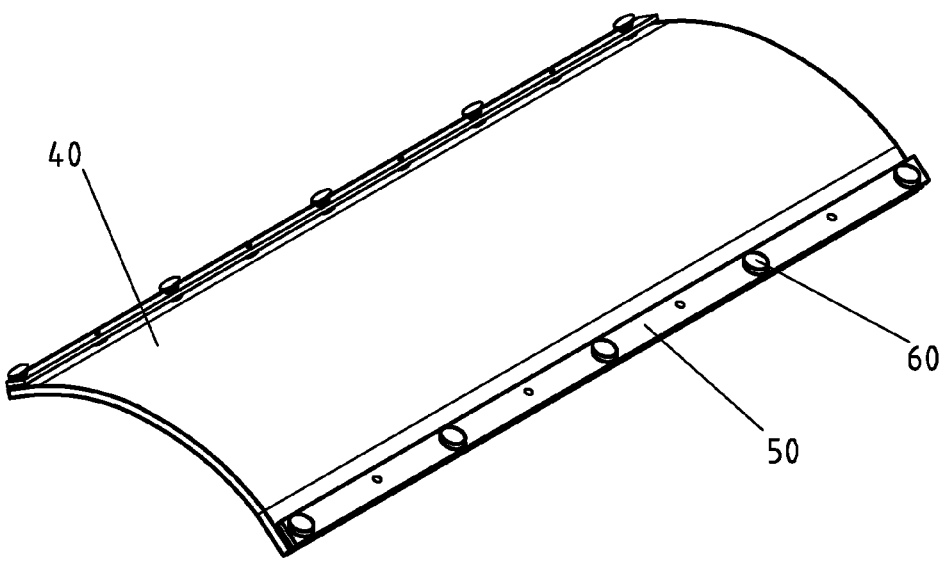
FIG. 2 is a perspective view of a PC plate with an adhesive tape specimen/aluminum strip assembly bonded thereon.

As FIG. 2 additionally illustrates, the frame substantially comprises, in addition to the arched metal plate 40, fixing rails 50 mounted on the sides, and adjusting screws 60.

The PC plate, then, is clamped into the frame in the transverse direction in such a way that its ends are fixed flush on the frame by the fixing rail, with the bonded aluminum plate visibly facing upward without fixing. The frame is stored in an oven at 50° C. After 1, 24 and 48 hours, the distance between the two ends of the aluminum test strip is measured at a 90° angle with respect to the PC plate. The result of the measurement is the total of both measured distances and is reported in mm. A duplicate determination is carried out, and the average is calculated.

The results of the measurements are interpreted as follows:

≤5 mm: advantageous

<10 mm: satisfactory 10-16 mm: still adequate

≥17 mm: not adequate.

| Commercially available chemicals used | | | |
|---|---|---|---|
| Chemical compound | Tradename | Manufacturer | CAS No. |
| Bis(4-tert-butylcyclohexyl) peroxydicarbonate | Perkadox ® 16 | Akzo Nobel | 15520-11-3 |
| 2,2'-Azobis(2-methylpropionitrile), AIBN | Vazo ® 64 | DuPont | 78-67-1 |
| Acrylic acid AA | — | Sigma-Aldrich | 79-10-7 |
| Butyl acrylate BA | — | BASF | 141-32-2 |
| 2-Ethylhexyl acrylate EHA | — | BASF | 103-11-7 |
| 2-Propylheptyl acrylate PHA | — | BASF | 149021-58-9 |
| Isobornyl acrylate IBOA | Visiomer ® IBOA | Evonik | 5888-33-5 |
| Pentaerythritol tetraglycidyl ether | D.E.R. ™ 749 | DOW | 3126-63-4 |
| 3,4-Epoxycyclohexylmethyl 3,4-—epoxycyclohexanecarboxylate | Uvacure ® 1500 | Cytec Industries Inc. | 2386-87-0 |
| N,N,N',N'-Tetrakis(2,3-epoxypropyl)cyclohexane-1,3-dimethylamine | Syna-Epoxy S610 | Synasia | 65992-66-7 |
| Tetraglycidyl-meta-xylenediamine | Erisys ™ GA-240 | CVC | 63738-22-7 |
| Aluminum acetylacetonate | — | Sigma-Aldrich | 13963-57-0 |
| 3-Glycidyloxypropyltriethoxysilane | Dynasylan ® GLYE0 | Evonik | 2602-34-8 |
| Isophoronediamine | Vestamin ® IPD | Evonik | 2855-13-2 |
| 3-Aminopropyltriethoxysilane | Dynasylan ® AMEO | Evonik | 919-30-2 |
| Resorcinol bis(diphenyl phosphate) | Reofos ® RDP | Chemtura | 57583-54-7 |
| Microballoons (MB) (dry-unexpanded microspheres, diameter 9-15 μm, expansion onset temperature 106-111° C., TMA density ≤ 25 kg/m$^3$) | Expancel ® 051 DU 40 | Expancel Nobel Industries | | aluminum plate. A polycarbonate plate (PC plate) 20 cm long, 2.5 cm wide and 3 mm thick is washed with ethanol and left to stand under conditions of 23° C.+/−1° C. temperature and 50%+/−5% relative humidity for 120 minutes. The assembly formed from the aluminum plate and the adhesive tape is bonded centrally on the PC plate to produce the test specimen. A defined bond is ensured by rolling back and forth over the assembly five times using a 4 kg roller and then leaving it to stand for 72 hours.

The PC plate with the adhesive tape specimen/aluminum strip assembly bonded thereon is clamped into a 33° NPT frame, the construction of which is shown in FIGS. 1 and 2. FIG. 1 shows a cross section of the frame, which possesses a curved metal plate 40. The definitions of the dimensions identified with a, b and c are as follows:

I. Preparation of Pressure-Sensitive Adhesives PA1 to PA4

The preparation of the starting polymers is described below. The polymers investigated are prepared conventionally via free radical polymerization in solution.

Polyacrylate PSA 1 (PA1)

A 300 L reactor conventional for radical polymerizations was charged with 11.0 kg of acrylic acid, 27.0 kg of butyl acrylate (BA), 62.0 kg of 2-ethylhexyl acrylate (EHA) and also 72.4 kg of acetone/isopropanol (94:6). After nitrogen gas had been passed through the reactor for 45 minutes with stirring, the reactor was heated to 58° C. and 50 g of Vazo® 67 were added.

The external heating bath was then heated to 75° C. and the reaction was carried out constantly at this external temperature. After a reaction time of 1 hour a further 50 g of Vazo® 67 were added. After 3 hours the batch was diluted with 20 kg of acetone/isopropanol (94:6), and after 6 hours with 10.0 kg of acetone/isopropanol (94:6). To reduce the residual initiators, 0.15 kg portions of Perkadox® 16 were added after 5.5 and again after 7 hours. The reaction was discontinued after a time of 24 hours and the batch was cooled to room temperature. The polyacrylate was then blended with the crosslinker, diluted to a solids content of 30% with acetone, and then coated from solution onto a siliconized release film (50 μm polyester). (Coating speed 2.5 m/min, drying tunnel 15 m, temperatures zone 1: 40° C., zone 2: 70° C., zone 3: 95° C., zone 4: 105° C.). The coatweight was 50 g/m². Molar masses by GPC (measurement method A3): $M_n$=28 000 g/mol; $M_w$=1 050 000 g/mol. K value: 50.5.

Polyacrylate PSA 2 (PSA2)

A 100 L glass reactor conventional for radical polymerizations was charged with 4.0 kg of acrylic acid, 12.0 kg of BA, 24.0 kg of 2-propylheptyl acrylate PHA and also 26.7 kg of acetone/benzine 60/95 (1:1). After nitrogen gas had been passed through the reactor for 45 minutes with stirring, the reactor was heated to 58° C. and 30 g of AIBN were added. The external heating bath was then heated to 75° C. and the reaction was carried out constantly at this external temperature. After a reaction time of 1 hour a further 30 g of AIBN were added. After 4 hours and 8 hours the batch was diluted with 10.0 kg each time of acetone/benzine 60/95 (1:1) mixture. To reduce the residual initiators, 90 g portions of Perkadox® 16 were added after 8 and again after 10 hours. The reaction was discontinued after a time of 24 hours and the batch was cooled to room temperature. The polyacrylate was then blended with the crosslinker, diluted to a solids content of 30% with acetone, and then coated and dried in the same way as for PA1. The coatweight was 50 g/m². Molar masses by GPC (measurement method A3): $M_n$=25 700 g/mol; $M_w$=891 000 g/mol. K value: 49.8.

Polyacrylate PSA 3 (PA3):

A 100 L glass reactor conventional for radical polymerizations was charged with 3.2 kg of acrylic acid, 4.8 kg of isobornyl acrylate (IBOA), 17.0 kg of EHA, 15.0 kg of BA and also 26.7 kg of acetone/benzine 60/95 (1:1). After nitrogen gas had been passed through the reactor for 45 minutes with stirring, the reactor was heated to 58° C. and 30 g of AIBN were added. The external heating bath was then heated to 75° C. and the reaction was carried out constantly at this external temperature. After a reaction time of 1 hour a further 30 g of AIBN were added. After 4 hours and 8 hours the batch was diluted with 10.0 kg each time of acetone/benzine 60/95 (1:1) mixture. To reduce the residual initiators, 90 g portions of bis(4-tert-butylcyclohexyl) peroxydicarbonate were added after 8 and again after 10 hours. The reaction was discontinued after a time of 24 hours and the batch was cooled to room temperature. The polyacrylate was then blended with the crosslinker, diluted to a solids content of 30% with acetone, and then coated and dried in the same way as for PA1. The coatweight was 50 g/m². Molar masses by GPC (measurement method A3): $M_n$=25 100 g/mol; $M_w$=1 080 000 g/mol. K value: 51.1.

Polyacrylate PSA 4 (PA4):

A 100 L glass reactor conventional for radical polymerizations was charged with 4.0 kg of acrylic acid, 18.0 kg of EHA, 18.0 kg of BA and also 26.7 kg of acetone/benzine 60/95 (1:1). After nitrogen gas had been passed through the reactor for 45 minutes with stirring, the reactor was heated to 58° C. and 30 g of AIBN were added. The external heating bath was then heated to 75° C. and the reaction was carried out constantly at this external temperature. After a reaction time of 1 hour a further 30 g of AIBN were added. After 4 hours and 8 hours the batch was diluted with 10.0 kg each time of acetone/benzine 60/95 (1:1) mixture. To reduce the residual initiators, 90 g portions of bis(4-tert-butylcyclohexyl) peroxydicarbonate were added after 8 and again after 10 hours. The reaction was discontinued after a time of 24 hours and the batch was cooled to room temperature. The polyacrylate was then blended with the crosslinker, diluted to a solids content of 30% with acetone, and then coated and dried in the same way as for PA1. The coatweight was 50 g/m². Molar masses by GPC (measurement method A3): $M_n$=21 000 g/mol; $M_w$=1 050 000 g/mol. K value: 50.0.

Table 1 sets out the composition of inventive examples B1-B6 and of comparative examples VB7-VB11.

TABLE 1

Examples B1-B6, B11, B12 and comparative examples VB7-VB10

| Ex. | PA | Covalent crosslinker [wt %] | Coordinative crosslinker [wt %] | $n_{cov}$ [mmol/g pol.][1] | $n_{coord}$ [mmol/g pol.][1] | Ratio $n_{cov}/n_{coord}$ [–] |
|---|---|---|---|---|---|---|
| B1 | PA1 | 0.035 Erisys | 0.140 Al chelate[2] | 3.17 | 0.66 | 4.8 |
| B2 | PA1 | 0.030 S610 | 0.085 Al chelate | 3.22 | 0.40 | 8.1 |
| B3 | PA2 | 0.042 S610 | 0.155 Al chelate | 4.51 | 0.73 | 6.2 |
| B4 | PA3 | 0.035 Erisys | 0.125 Al chelate | 3.17 | 0.59 | 5.4 |
| B5 | PA4 | 0.030 Erisys | 0.125 Al chelate | 2.72 | 0.59 | 4.6 |
| B6 | PA1 | 0.220 Uvacure | 0.053 Al chelate | 1.21 | 0.25 | 4.8 |
| VB7 | PA1 | 0.035 Erisys | — | 3.17 | — | — |
| VB8 | PA1 | 0.042 Erisys | — | 3.83 | — | — |
| VB9 | PA1 | — | 0.140 Al chelate | — | 0.66 | — |
| VB10 | PA1 | — | 0.812 Al chelate | — | 3.83 | — |
| B11 | PA2 | 0.030 Erisys | 0.200 Al chelate | 2.72 | 0.94 | 2.9 |
| B12 | PA3 | 0.220 Uvacure | 0.028 Al chelate | 1.21 | 0.13 | 9.3 |

[1] mmol of functional groups of the covalent crosslinker or binding sites of the coordinative crosslinker per g of polymer
[2] Al chelate = aluminum acetylacetonate II Preparation of the Starting Polymers for the Polyacrylate Foams VT1 and VT2 and Also the PSA Tape Examples MT1 to MT14

Described below is the preparation of the starting polymer, which was prepared conventionally by a free radical polymerization in solution.

Base Polymer P1

A reactor conventional for radical polymerizations was charged with 3.0 kg of acrylic acid, 30.0 kg of EHA, 67.0 kg of BA and 66 kg of acetone/isopropanol (96:4). After nitrogen gas had been passed through the reactor for 45 minutes, with stirring, the reactor was heated to 58° C. and 50 g of Vazo® 67 were added. The external heating bath was then heated to 75° C. and the reaction was carried out constantly at this external temperature. After 1 hour a further 50 g of Vazo® 67 were added, and after 4 hours the batch was diluted with 20 kg of acetone/isopropanol mixture (96:4). After 5 hours and again after 7 hours, re-initiation took place with 150 g of Perkadox® 16 each time, and dilution with 23 kg of acetone/isopropanol mixture (96:4). After a reaction time of 22 hours, the polymerization was discontinued and the batch was cooled to room temperature. The polyacrylate has a K value of 75.1, solids content of 50.2% and average molecular weights of $M_n$=91 900 g/mol and $M_w$=1 480 000 g/mol.

Base Polymer P2

A reactor conventional for radical polymerizations was charged with 10.0 kg of acrylic acid, 45.0 kg of EHA, 45.0 kg of BA and 66 kg of acetone/isopropanol (94:6). After nitrogen gas had been passed through the reactor for 45 minutes, with stirring, the reactor was heated to 58° C. and 50 g of Vazo® 67 were added. The external heating bath was then heated to 75° C. and the reaction was carried out constantly at this external temperature. After 1 hour a further 50 g of Vazo® 67 were added, and after 4 hours the batch was diluted with 25 kg of acetone/isopropanol mixture (94:6). After 5 hours and again after 7 hours, re-initiation took place with 150 g of Perkadox® 16 each time, and dilution with 23 kg of acetone/isopropanol mixture (94:6). After a reaction time of 22 hours, the polymerization was discontinued and the batch was cooled to room temperature. The polyacrylate has a K value of 49.1, solids content of 49.5% and average molecular weights of $M_n$=21 900 g/mol and $M_w$=890 000 g/mol.

Process 1: Concentration/Preparation of Hotmelt PSAs:

The base polymer P was very largely freed from the solvent by means of a single-screw extruder (concentrating extruder, Berstorff GmbH, Germany) (residual solvent content ≤0.3 wt %). The parameters for the concentration of the base polymer were as follows: the screw speed was 150 rpm, the motor current 15 Å, and a throughput of 58.0 kg/h liquid was realized. For concentration, a vacuum was applied at three different domes. The reduced pressures were, respectively, between 20 mbar and 300 mbar. The exit temperature of the concentrated hotmelt P was approximately 115° C. The solids content after this concentration step was 99.8%.

Figure 3:
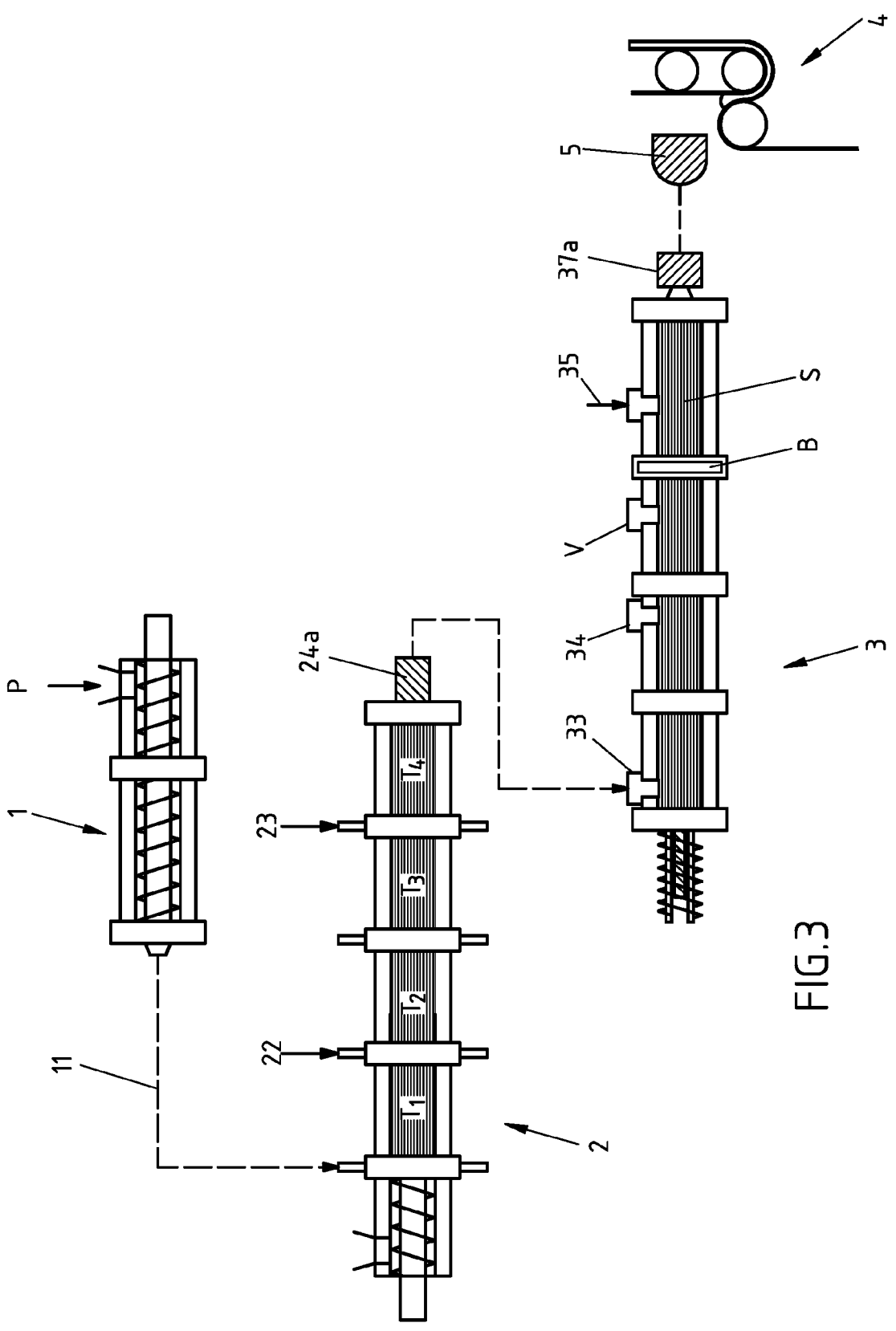
FIG. 3 is a schematic of an experimental unit with which foaming takes place.

Process 2: Production of Inventive Adhesive Tapes, Blending with the Crosslinker-Accelerator System for Thermal Crosslinking, and Coating Foaming takes place in an experimental unit corresponding to the illustration in FIG. 3.

The concentrated base polymer P is melted by process 1 in a feeder extruder 1 and conveyed by this extruder in the form of a polymer melt, via a heatable hose 11, into a planetary roller extruder 2 (PRE) from ENTEX (Bochum) (the PRE used in particular has four modules T1, T2, T3 and T4 which are heatable independently of one another). Via the metering point 22 it is possible to supply additional additives or fillers, such as color pastes, for example. At point 23 the crosslinker is added. All of the components are mixed to form a homogeneous polymer melt.

By means of a melt pump 24a, the polymer melt is transferred to a twin-screw extruder 3 (from BERSTORFF) (feed position 33). At position 34, the accelerator component is added. The mixture as a whole is subsequently freed from all gas inclusions in a vacuum dome V at a pressure of 175 mbar (see above for the criterium for gas-free status). Downstream of the vacuum zone, on the screw, there is a blister B, which allows a build-up of pressure in the subsequent segment S. Through appropriate control of the extruder speed and of the melt pump 37a, a pressure of greater than 8 bar is built up in the segment S between blister B and melt pump 37a; at the metering site 35, the microballoon mixture (microballoons embedded into the dispersing assistant in accordance with the details in table 2) is added and is incorporated homogeneously into the premix by means of a mixing element. The resulting melt mixture is transferred into a die 5.

After exit from the die 5, in other words after a drop in pressure, the incorporated microballoons undergo expansion, with the drop in pressure resulting in a low-shear, more particularly shear-free, cooling of the polymer composition. This produces a foamed PSA which is subsequently coated between two release materials, which can be used again after being removed (process liners), and the PSA is shaped to a web by means of a rolled calander 4.

In order to improve the anchoring of the PSAs from the inventive and comparative examples on the shaped polyacrylate foam, not only the PSAs but also the foam were corona-pretreated (corona unit from VITAPHONE, Denmark, 70 W·min/m²). After the production of the three-layer assembly, this treatment resulted in improved chemical attachment to the polyacrylate foam carrier layer.

The belt speed during passages through the coating unit was 30 m/min.

Downstream of the roll nip, any antiadhesive carrier was removed, and the completed three-layer product was wound up together with the remaining, second antiadhesive carrier.

TABLE 2

| Polyacrylate foams VT1 and VT2 | | | |
|---|---|---|---|
| VT1 | | | |
| Components | Base polymer P1 | [wt %] | 97.8 |
|  | Expancel 051 DU 40 |  | 1.5 |
|  | Polypox R16 |  | 0.139 |
|  | IPDA |  | 0.144 |
|  | Reofos RDP |  | 0.41 |
| Construction | Thickness | [μm] | 902 |
|  | Density | [kg/m³] | 749 |
| VT2 | | | |
| Components | Base polymer P1 | [wt %] | 97.9 |
|  | Expancel 051 DU 40 |  | 1.2 |
|  | GLYEO |  | 0.197 |
|  | AMEO |  | 0.315 |
|  | Reofos RDP |  | 0.41 |
| Construction | Thickness | [μm] | 908 |
|  | Density | [kg/m³] | 851 |

Density: measurement method A4

Presented below are concrete examples of the production of the adhesive tapes of the invention comprising the polyacrylate foam carriers VT1 and VT2 with the PSA examples B1-B6 and B11-B12 of the invention, with a double-sided coatweight of 50 g/m², and comparative examples comprising the polyacrylate foam carriers VT1 and VT2 with the noninventive PSA examples VB7-VB10, likewise with a double-sided coatweight of 50 g/m².

TABLE 3

Peel adhesion on steel and ABS and also peel increase of the three-
layer PSA tapes MT1-MT14 comprising the polyacrylate foam
carriers VT1 or VT2 with total thicknesses of 1000 μm

| Ex. | PSA both sides | VT | Peel adhesion, steel, instantaneous [N/cm] | | Peel adhesion, steel, 8 h, [N/cm] | Peel adhesion, steel, 1 d, [N/cm] | Peel adhesion, steel, 3 d, [N/cm] | Peel adhesion, ABS, 3 d, [N/cm] |
|---|---|---|---|---|---|---|---|---|
| | | | open side | lined side | open side | open side | open side | open side |
| MT1 | B1 | 1 | 18.7 | 18.5 | 44 | 54 f.s. | 55 f.s. | 36.1 |
| MT2 | B2 | 1 | 16.3 | 15.1 | 44 | 54 f.s. | 56 f.s. | 38.3 |
| MT3 | B3 | 1 | 15.2 | 15.5 | 37 | 54 f.s. | 56 f.s. | 35.2 |
| MT4 | B4 | 1 | 15.2 | 15.9 | 36 | 45 f.s. | 47 f.s. | 39.4 |
| MT5 | B5 | 1 | 11.2 | 12.3 | 34 | 45 f.s. | 45 f.s. | 32.1 |
| MT6 | B6 | 1 | 16.2 | 16.1 | 42 | 44 f.s. | 44 f.s. | 32.6 |
| MT7 | B1 | 2 | 18.7 | 18.5 | 44 | 54 f.s. | 55 f.s. | 36.6 |
| MT8 (Comp.) | VB7 | 1 | 10.4 | 10.5 | 28 | 44 | 49 f.s. | 24.3 |
| MT9 (Comp.) | VB8 | 1 | 9.6 | 8.9 | 14 | 38 | 44 | 18.3 |
| MT10 (Comp.) | VB9 | 1 | 12.2 | 12.2 | 45 | 47 f.s. | 48 f.s. | 29.3 |
| MT11 (Comp.) | VB10 | 1 | 9.2 | 9.1 | 16 | 23 | 25 | 10.2 |
| MT12 | B11 | 1 | 13.7 | 13.7 | 47 | 50 f.s. | 50 f.s. | 34.2 |
| MT13 | B11 | 2 | 11.8 | 11.9 | 56 | 55 f.s. | 54 f.s. | 34.4 |
| MT14 | B12 | 1 | 15.8 | 15.9 | 25 | 36 | 37 | 28.1 |

Comp. = comparative example,
PSA = pressure-sensitive adhesive,
VT = foam carrier,
f.s. = foam split From the peel adhesion measurements in table 3 it is apparent that the inventive PSA tapes adhere very quickly to steel and attain their maximum peel adhesion, or result in splitting of the polyacrylate foam carrier. Furthermore, all of the examples likewise exhibit good peel adhesion values on ABS.

If, conversely, only a covalent crosslinker or a coordinative crosslinker is used, it often takes longer for the peel adhesion values in the equilibrium state to be achieved, and the peel adhesion values on ABS are somewhat lower. In example MT8, the polymers and the amount of covalent crosslinker are the same as for example MT1; it is found that the omission of a reversible, coordinative crosslinker impairs the peel increase. Similarly, in example MT10, the total number of binding sites in the coordinative crosslinker is comparable with example MT1; it is apparent that the peel adhesion values decrease. In examples MT12-14, the ratio of covalent groups to the binding sites of the coordinative crosslinker is either below or above the preferred ratio. This has no adverse consequences for the peel increase or for the level of peel adhesion.

TABLE 4

Holding power times and Name-Plate test results for the three-layer
PSA tapes MT1-MT14 with total thicknesses of 1000 μm

| Ex. | HP, 10 N, 23° C. [min] | HP, 10 N, 70° C. [min] | NPT, 1 h [mm] | NPT, 24 h [mm | NPT, 48 h [mm |
|---|---|---|---|---|---|
| MT1 | >10 000 | >10 000 | 0 | 3 | 3 |
| MT2 | >10 000 | >10 000 | 0 | 3 | 3 |
| MT3 | >10 000 | >10 000 | 1 | 3 | 3 |
| MT4 | >10 000 | >10 000 | 0 | 4 | 4 |
| MT5 | >10 000 | >10 000 | 0 | 3 | 3 |
| MT6 | >10 000 | 8900 (Co) | 0 | 6 | 6 |
| MT7 | >10 000 | >10 000 | 0 | 5 | 5 |

TABLE 4-continued

Holding power times and Name-Plate test results for the three-layer
PSA tapes MT1-MT14 with total thicknesses of 1000 μm

| Ex. | HP, 10 N, 23° C. [min] | HP, 10 N, 70° C. [min] | NPT, 1 h [mm] | NPT, 24 h [mm | NPT, 48 h [mm |
|---|---|---|---|---|---|
| MT8 (Comp.) | >10 000 | >10 000 | 15 | 25 | 30 |
| MT9 (Comp.) | >10 000 | >10 000 | 18 | 30 | 36 |
| MT10 (Comp.) | >10 000 | 1680 (Co) | 5 | 8 | 9 |
| MT11 (Comp.) | 2000 (A) | 1200 (A) | 6 | 33 | 37 |
| MT12 | >10 000 | 7380 (Co) | 2 | 12 | 16 |
| MT13 | >10 000 | 7210 (Co) | 10 | 13 | 14 |
| MT14 | >10 000 | >10 000 | 7 | 15 | 16 |

HP = holding power times, 23° and 70° C. = measurement method M2,
A: adhesive failure, Co: cohesive failure;
NPT = Name-Plate test = measurement method M3

The differences between the pressure-sensitive adhesive tapes are visible best in the Name-Plate test (table 4). Here it is apparent that the use of a covalent crosslinker alone, in particular, may lead to a pronounced edge lifting in the Name-Plate test (MT8, MT9). A similar behavior, to less of an extent, is apparent when a combination of a covalent and a coordinative crosslinker is used in the less-preferred ratio of the functional groups to the binding sites (MT12-MT14), with here additionally the influence of the foamed carrier being apparent. The carrier VT2 (MT13), which is stiffer because of the greater concentration of acrylic acid, leads to a relatively poor initial value after 1 hour as compared with the somewhat softer carrier VT1 (MT12). If, on the other hand, only a coordinative crosslinker is used (MT10, MT11), the resulting Name-Plate test results are approximately comparable with those for the crosslinker system of the invention; however, the thermal shear strength is significantly poorer.

The invention claimed is:

1. An adhesive tape comprising:

a foamed layer having a first side and a second side;

a first pressure-sensitive adhesive layer arranged on the first side of the foamed layer;

a second pressure-sensitive adhesive layer arranged on the second side of the foamed layer;

wherein the foamed layer has a thickness of 300-2500 µm;

wherein each of the first and second pressure-sensitive adhesive layers has a thickness of 40-100 µm;

wherein the first and second pressure-sensitive adhesive layers are compositionally identical and comprise at least one poly(meth)acrylate;

wherein said at least one poly(meth)acrylate is cross-linked with both a covalent crosslinker and a coordinative crosslinker;

wherein a molar ratio of functional groups of the covalent crosslinker to binding sites of the coordinative crosslinker is 3:1 to 9:1;

wherein said covalent crosslinker is a polyfunctional glycidylamine compound selected from the group consisting of N,N,N', N'-tetrakis(2,3-epoxypropyl)cyclo-hexane-1,3-dimethylamine and N,N,N',N'-tetrakis(2,3-epoxypropyl)-m-xylene-a,a'-diamine;

wherein said coordinative crosslinker is selected from the group consisting of polyvalent metal chelate compounds comprising a polyvalent metal ion selected from the group consisting of Al(III), Zr(IV) and Ti(IV).

2. The adhesive tape as claimed in claim 1, wherein the coordinative crosslinker is selected from the group consisting of titanium dipropoxide bis(acetylacetonate), titanium dibutoxide bis(octylene glycolate), titanium dipropoxide bis (ethyl acetoacetate), titanium dipropoxide bis(lactate), titanium dipropoxide bis(triethanolaminate), titanium di-n-butoxide bis(triethanolaminate), titanium tri-n-butoxide monostearate, butyl titanate dimer, poly(titanium acetylacetonate), aluminum diisopropoxide monoethyl acetate, aluminum di-n-butoxide monomethyl acetoacetate, aluminum diisobutoxide monomethyl acetoacetate, aluminum di-n-butoxide monoethyl acetoacetate, aluminum di-sec-butoxide monoethyl acetoacetate, aluminum triacetylacetonate, aluminum monoacetylacetonate bis(ethyl acetoacetonate), and zirconium tetraacetylacetonate.

3. A method of bonding a substrate with an adhesive tape, said method comprising applying to said substrate the adhesive tape as claimed in claim 1.

4. The method according to claim 3, wherein the substrate is selected from metals, plastics, and automobile finishes.

5. The adhesive tape according to claim 1, wherein the adhesive tape is free of a release liner.

6. The adhesive tape according to claim 1, wherein said covalent crosslinker is a polyfunctional glycidylamine compound selected from the group consisting of N,N,N',N'-tetrakis(2,3-epoxypropyl)cyclohexane-1,3-dimethylamine and N,N,N',N'-tetrakis(2,3-epoxypropyl)-m-xylene-a,a'-diamine.

7. An adhesive tape comprising:

a foamed layer having a first side and a second side;

a first pressure-sensitive adhesive layer arranged on the first side of the foamed layer;

a second pressure-sensitive adhesive layer arranged on the second side of the foamed layer;

wherein the foamed layer has a thickness of 300-2500 µm;

wherein each of the first and second pressure-sensitive adhesive layers has a thickness of 40-100 µm;

wherein the first and second pressure-sensitive adhesive layers are compositionally identical and comprise at least one poly(meth)acrylate;

wherein said at least one poly(meth)acrylate is cross-linked with both a covalent crosslinker and a coordinative crosslinker;

wherein a molar ratio of functional groups of the covalent crosslinker to binding sites of the coordinative crosslinker is 3:1 to 9:1;

wherein said covalent crosslinker is a polyfunctional glycidylamine compound selected from the group consisting of N,N,N',N'-tetrakis(2,3-epoxypropyl)cyclohexane-1,3-dimethylamine and N,N,N',N'-tetrakis(2,3-epoxypropyl)-m-xylene-a,a'-diamine; and wherein said coordinative crosslinker is aluminum triacetylacetonate.

* * * * *